United States Patent
Coffland

(10) Patent No.: US 7,978,847 B1
(45) Date of Patent: Jul. 12, 2011

(54) SYSTEM USING DATA COMPRESSION AND HASHING ADAPTED FOR USE FOR MULTIMEDIA ENCRYPTION

(75) Inventor: Douglas R. Coffland, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 951 days.

(21) Appl. No.: 09/405,031

(22) Filed: Sep. 24, 1999

(51) Int. Cl.
*H04L 9/00* (2006.01)
*H04N 7/167* (2011.01)

(52) U.S. Cl. ......................................................... 380/44

(58) Field of Classification Search .................. 364/717, 364/78; 380/28, 46, 264, 213, 205, 214, 380/267, 44, 277, 283; 386/94; 705/51, 705/57; 713/171
See application file for complete search history.

(56) References Cited

U.S. PATENT DOCUMENTS

| | | | |
|---|---|---|---|
| 4,332,027 A | 5/1982 | Malcolm et al. ................. 370/94 |
| 4,545,024 A * | 10/1985 | Maher et al. .................. 708/255 |
| 4,905,176 A | 2/1990 | Schulz .......................... 364/717 |
| 5,065,256 A | 11/1991 | Suganuma et al. ............ 358/455 |
| 5,732,138 A | 3/1998 | Noll et al. ....................... 380/28 |
| 5,757,923 A * | 5/1998 | Koopman, Jr. .................. 380/46 |
| 5,774,549 A | 6/1998 | Nielsen ............................ 380/20 |
| 6,215,874 B1 * | 4/2001 | Borza et al. ..................... 380/46 |
| 6,363,210 B1 * | 3/2002 | Owashi et al. ................... 386/94 |
| 6,526,144 B2 * | 2/2003 | Markandey et al. ............ 380/28 |
| 6,570,990 B1 * | 5/2003 | Kohn et al. .................... 380/213 |

OTHER PUBLICATIONS

Callas, John; "Using and Creating Cryptographic-Quality Random Numbers"; Jun. 3, 1996; www.merrymeet.com.*
Wu et al., "Joint Image/Video Compression and Encryption via High-Order Conditional Entropy Coding of Wavelet Coeffcients", Jun. 11, 1999, IEEE, vol. 2, pp. 908-912.*
Lavarand . . . harnessing the power of Lava Lite lamps to generate truly random numbers since 1996.
Hong et al, "Design of Random Noise Generator Using SW Algorithm," Publication, pp. 9-14, Korea.
"Lawrence Livermore National Laboratory," Wikipedia, the free encyclopedia.
Lawrence Livermore National Laboratory, www.llnl.gov, 2 pages, printed Aug. 30, 2007.
List of Dr. Borko Furht's Publications, 9 pages.
Borko et al, "Fundamentals of Multimedia Encryption Techniques," Publication, 50 pages, USA.

* cited by examiner

*Primary Examiner* — Jacob F Bétit
(74) *Attorney, Agent, or Firm* — Eddie E. Scott; Lloyd E. Dankin, Jr.; James S. Tak

(57) ABSTRACT

A system and method is disclosed for multimedia encryption. Within the system of the present invention, a data compression module receives and compresses a media signal into a compressed data stream. A data acquisition module receives and selects a set of data from the compressed data stream. And, a hashing module receives and hashes the set of data into a keyword. The method of the present invention includes the steps of compressing a media signal into a compressed data stream; selecting a set of data from the compressed data stream; and hashing the set of data into a keyword.

30 Claims, 3 Drawing Sheets

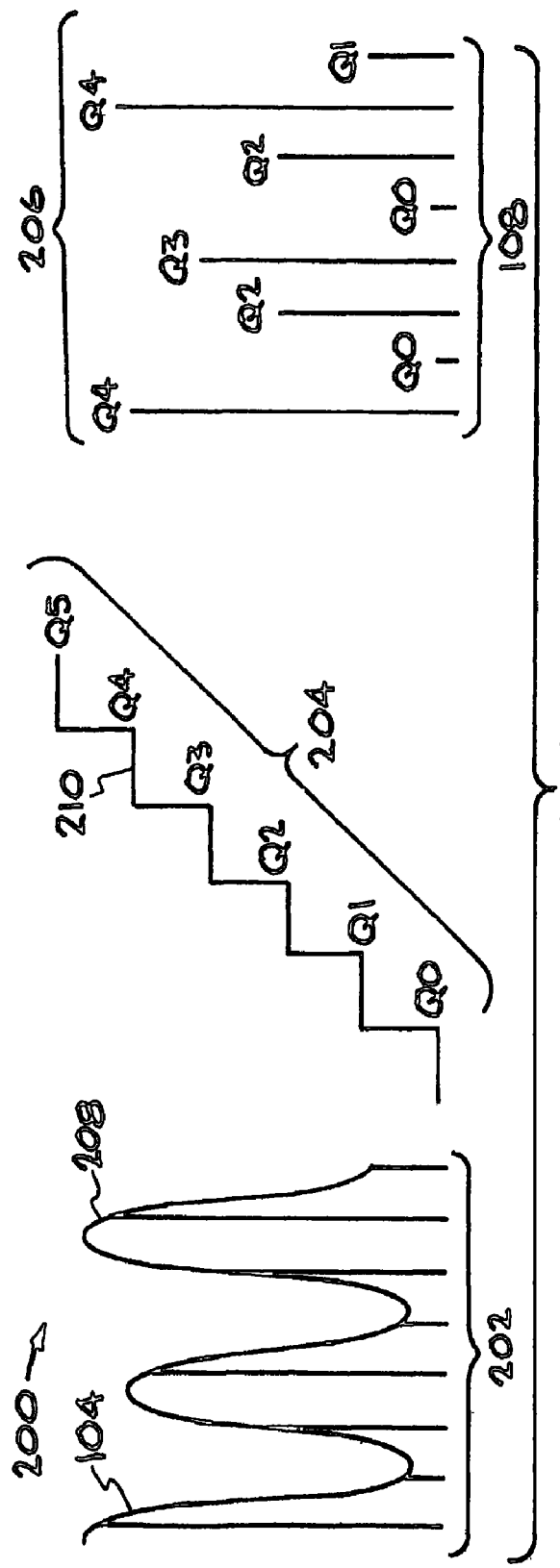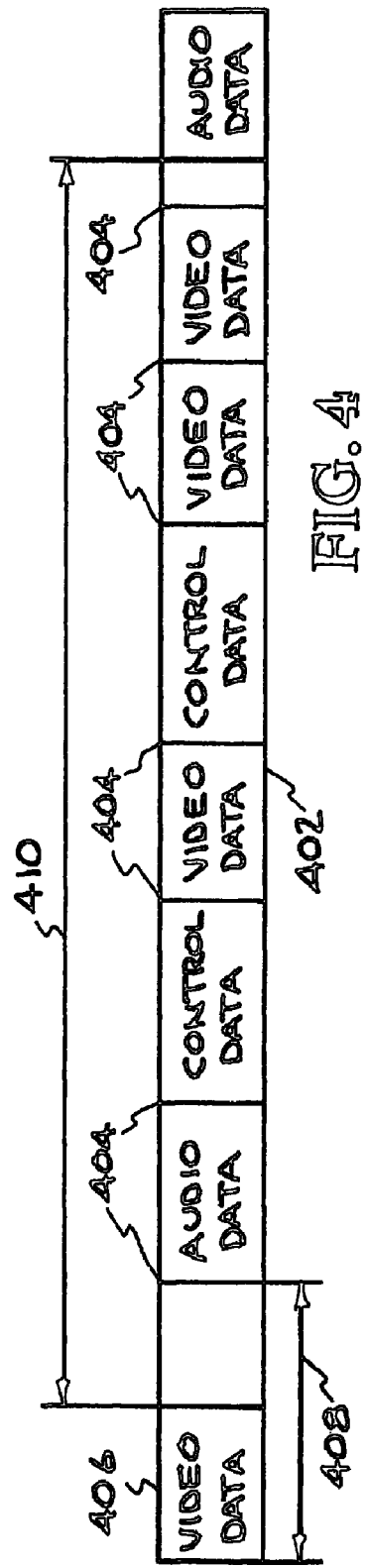

SYSTEM USING DATA COMPRESSION AND HASHING ADAPTED FOR USE FOR MULTIMEDIA ENCRYPTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to systems and methods for encryption, and more particularly for multimedia encryption.

2. Discussion of Background Art

Transmission of audio and video signals, such as video conferencing and security surveillance signal, across both local and wide area networks is becoming more and more commonplace in today's globally interconnected internet driven economy. In such applications, encryption is often required for protecting and authenticating such multimedia signals as they travel over unsecured networks. For instance, corporations often exchange business sensitive information during such conferences which must not be intercepted. Additionally, multimedia information from networked security camera systems must be authenticated and protected from unauthorized monitoring.

A degree to which encryption authenticates and protects multimedia data depends on the encryption schema used, an encryption key length, the predictability of the encryption key, and how the encryption keys are protected. Typically, encryption keys are generated by hashing algorithms from random number seeds provided by a source which hopefully provides random number seeds. Random number seeds, however, are extremely difficult if not impossible to generate using algorithmic methods on digital computers, since algorithms executing on digital computers are by nature deterministic. As a result, various external chaotic sources have been used to generate the random number seeds.

Examples include methods described in U.S. Pat. No. 5,732,138 entitled, "Method For Seeding A Pseudorandom Number Generator With A Cryptographic Hash Of A Digitization Of A Chaotic System," by Noll et al., and U.S. Pat. No. 5,774,549 entitled, "Method And Apparatus That Processes A Video Signal To Generate A Random Number Generator Seed" by Jakob Nielsen.

Noll discusses generating seeds by applying a hashing algorithm to a digitized chaotic system. Chaotic systems mentioned include clouds moving in the sky, ocean waves crashing on a shoreline, and nodules moving within a "lava-lamp." A weakness of the Noll system, however, is that in his preferred embodiment, new seed generation depends upon using dedicated input devices to monitor "real-world scenes," such as a video camera monitoring a lava-lamp, in order to obtain the necessary chaotic input for eventual random number generation.

Nielsen also requires dedicated input devices, such as a video camera. Nielsen monitors "live" scenes with a video camera and then generates seeds from pixel changes within sequential frames of video data. A weakness of the Nielsen system is that new seeds are not generated when motion within a monitored scene stops.

In response to the concerns discussed above, what is needed is a system and method for multimedia encryption that overcomes the problems of the prior art.

SUMMARY OF THE INVENTION

The present invention is a system and method for multimedia encryption. Within the system of the present invention, a data compression module receives and compresses a media signal into a compressed data stream. A data acquisition module receives and selects a set of data from the compressed data stream. And, a hashing module receives and hashes the set of data into a keyword.

In other aspects of the invention, the system may include a data compression module that compresses the media signal into any compression format that has varying length data frames. Examples of media compression formats that with varying length data frames include MPEG1, MPEG2, MPEG4, MJPEG, and H.261. The set of data can be one frame of data, cross over several frame boundaries, include compression transform coefficients, include predictive data frames. Finally, a pseudo-random number generator can processes a single keyword seed in to a set of keywords.

The method of the present invention includes the steps of compressing a media signal into a compressed data stream; selecting a set of data from the compressed data stream; and hashing the set of data into a keyword.

The system/apparatus and method of the present invention are particularly advantageous over the prior art because a means of capturing random numbers for encryption seeding directly from variable frame boundary compressed data is disclosed. In light of a growing importance in securely transmitting multimedia data over digital networks, obtaining random numbers directly from the multimedia data would be very useful.

These and other aspects of the invention will be recognized by those skilled in the art upon review of the detailed description, drawings, and claims set forth below.

BRIEF DESCRIPTION OF THE DRAWINGS

FIG. 2 is a graphical depiction of quantization processes within an analog-to-digital converter within the system;

FIG. 4 is a graphical depiction of how a data acquisition module operates within the system.

DETAILED DESCRIPTION OF THE PREFERRED EMBODIMENT

Figure 1:
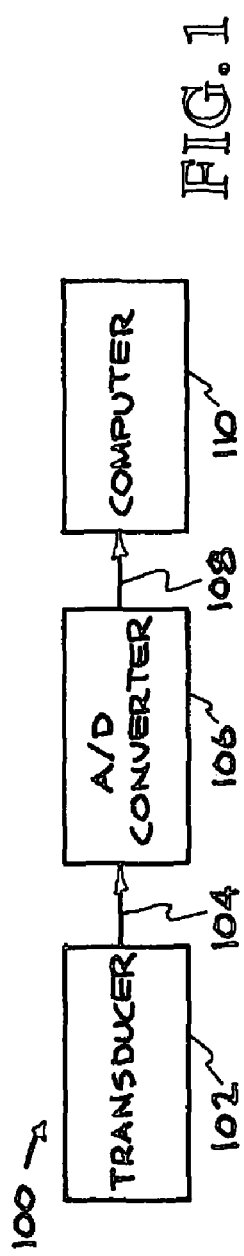
FIG. 1 is a block diagram of a system for multimedia encryption according to the present invention.

FIG. 1 is a block diagram of a system 100 for multimedia encryption according to the present invention. Within the system 100, a transducer 102, such as a video camera, a radio, a microphone, a Geiger counter, or an electrical component, outputs a media signal 104.

The media signal 104 may or may not contain useful information, such as an actual video scene or audio output, and the present invention does not require that useful information be present. For example, while a video camera could be capturing a scene, this is not required, and instead a lens-cap could be on the camera causing the scene to be perfectly quiescent. In one embodiment of the present invention, the media signal need only include random transducer noise having a noise signal amplitude. Random noise is not the same a chaotic noise. Random noise, such as white Gaussian noise, is completely unpredictable from one moment to a next, while chaotic noise is highly predictable over short time periods. In a second embodiment of the invention, however, random transducer noise need not even be present. Instead, data compression techniques provide a basis for multimedia encryption, as will be elaborated upon below.

The media signal 104 from the transducer 102 is fed into an analog-to-digital (A/D) converter 106. The converter 106 quantizes the media signal with a quantization step size smaller than the noise signal amplitude within the media signal 104, creating a quantized media signal 108. The quantized media signal 108 is then routed to a computer 110.

FIG. 2 is a graphical depiction of quantization processes within the analog-to-digital converter 106 within the system 100. The media signal 104 is periodically sampled 202. The samples 202 are then quantized at predefined steps 204 resulting in the quantized media signal 108. The quantized media signal 108 is a quantized approximation of the media signal 104 containing random transducer noise. The random noise in the media signal 104 will cause even unchanging video scenes to have quantization values 206 which fluctuate for media signal values close to one or more quantization steps 204. Thus, even a perfectly quiescent media signal 104 (e.g. when a lens cap is on a video camera containing the transducer 102) will contain some randomness from random transducer noise. Put another way, as long as a size of a smallest quantizer step is no larger than an amplitude of the transducer 102 noise, the quantized media signal 108 will include a high level of randomness even if input to the transducer is perfectly quiescent.

Typically, the transducer noise is sufficient to cause the quantization values 206 to fluctuate. However, if the transducer noise is small relative to the quantization steps 204, then either video or audio content of the media signal 104 must vary somewhat so that what little noise is in the scene will enable random noise to be quantized by the A/D converter 106. Randomness will be present in the media signal 104 when an actual sampled media signal value 208 is very close to a quantization boundary 210. When this occurs, a small transducer 102 signal will randomly cause the quantized media signal 108 to vary. It is possible to test whether sufficient random noise is present within the media signal 104 by looking at least significant bits of the media signal 104 and ensuring that no long sequences of a single bit value (i.e. ones or zeros) exist. Long sequences of zeros or ones in a least significant bit of the media signal 104 would suggest that the random noise is not of a sufficient amplitude to create random numbers.

In an alternate embodiment, distortion may be introduced into the media signal 104 generated by the transducer 102 such that the random transducer noise will have an amplitude greater than the quantization steps 204. Distortion may be introduced, for example, in a video camera by turning on an automatic gain control and increasing video camera gain. In another embodiment, focus and zoom of the camera can be varied while capturing video data.

Figure 3:
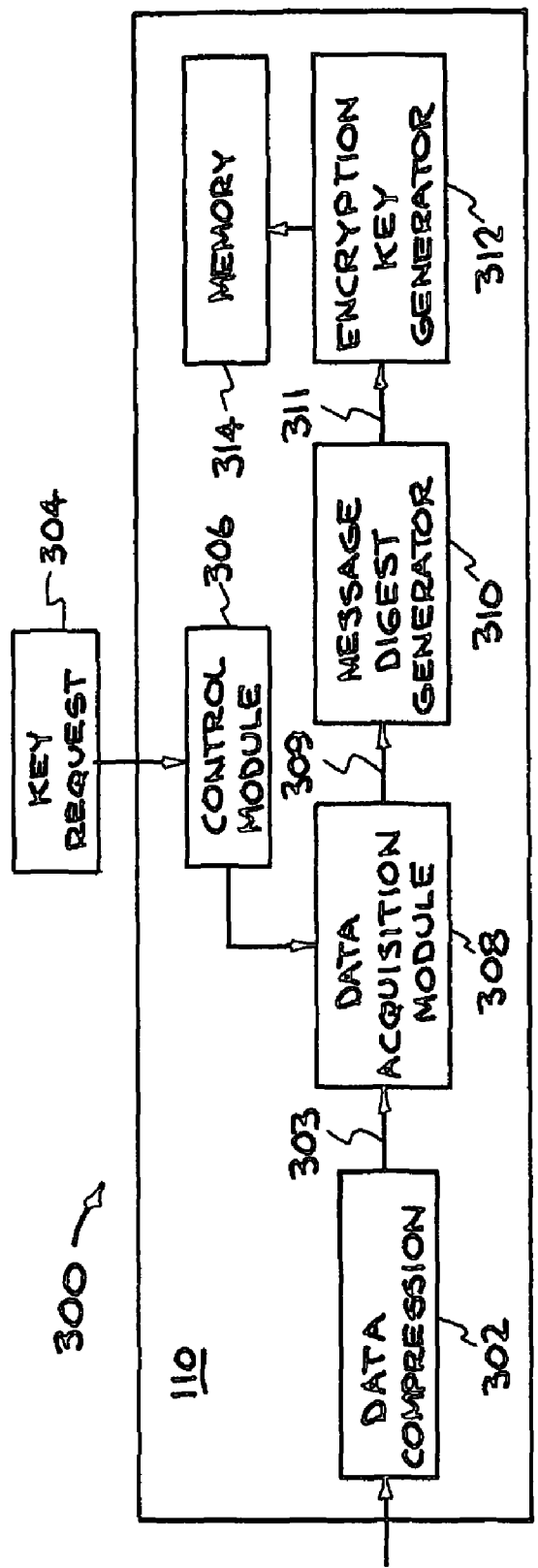
FIG. 3 is a block diagram of a computer within the system.

FIG. 3 is a block diagram 300 of the computer 110 within the system 100. Within the computer 110, a data compression module 302 compresses the quantized media signal 108 into a compressed data stream 303 using any number of formats, such as MJPEG, MPEG1, MPEG2, MPEG4, or H.261. Many other standard, as well as proprietary, media compression schemes also exist that are compatible with the present invention.

The compressed data stream 303 is partitioned into data frames of varying length, depending upon an amount of information contained in the media signal 104, variations in a scene or audio captured by the transducer 102, transducer noise, and system noise. For example, a 16384 byte amount of data acquired from an MPEG1 compressed data stream can include between one and eight frames of media data of varied length. For comparison, uncompressed media signals generally have a frame length which is fixed in size. For instance, uncompressed digital video signals include a series of fixed sized digital video images.

Under some compression schemas, the compressed data stream 303 includes predictive data frames. Predictive data frames only contain information which reports on differences between a current data frame and a most recent full data frame. Predictive data frames typically include motion vectors and error codes. Identical motion vectors and error codes between full frames indicate an absence of any video motion, audio, or transducer noise.

The compressed data stream 303 also can include compression transform coefficients, frame sequence numbers, and cyclic redundancy checks which vary from frame to frame. Identical transform coefficients between full frames indicate an absence of any video motion, audio, or transducer noise.

In response to a key request 304 received from an external source (not shown), a control module 306 instructs a data acquisition module 308 to collect a set of data 309 from the compressed data stream 303. The data acquisition module 308 operating in conjunction with the data compression module 302 creates a robust source of random numbers in the set of data 309. This is due to unpredictable variability between the compressed data stream 303 and random selection of the set of data 309 therefrom.

In an alternate embodiment, the data acquisition module 308 can be instructed to collect the set of data 309 directly from the quantized media signal 108 output by the A/D converter 106 before any data compression. An amount of data collected is dependent upon an amount of uncertainty required for a given application. A good rule of thumb is to capture an amount of data greater than or equal to a compressed full frame. However, when a large amount of noise is present in the media signal, a lesser amount of the media signal data needs to be collected.

A message digest generator 310 receives and processes the set of data 309 with a hashing algorithm. The message digest generator 310 generates a fixed-length unique identifier 311 for each pattern of bits in the set of data 309. Hashing algorithms assure that the resultant identifier 311 varies significantly even if the set of data 309 only varies by one bit. It is computationally infeasible to reconstruct the set of data 309 from only knowledge of the identifier 311. This identifier 311 is also called a keyword seed.

An encryption key generator 312 is a pseudo-random number generator that receives and processes the identifier 311 into a set of keywords to be immediately used or stored in a memory 314 for later use.

FIG. 4 is a graphical depiction 400 of how the data acquisition module 308 operates within the system 100. Shown is a typical compressed multimedia data stream 402. The data stream 402 includes compressed audio, video, and control data separated by frame boundaries 404. Each frame of data has a length, such as video data 406, which has a length 408. Within the multimedia data stream, lengths of each frame vary randomly, depending on a compression ratio as well as other well known compression algorithm factors. The data acquisition module 308 acquires a set of data 410 from the compressed data stream 303 without regard to any of these factors.

Thus, the set of data 410 can cross over the frame boundaries 404 in a random manner, resulting in a highly random, and unpredictable set of data 309. The set of data 309 thus can function as a robust keyword seed.

Figure 5:
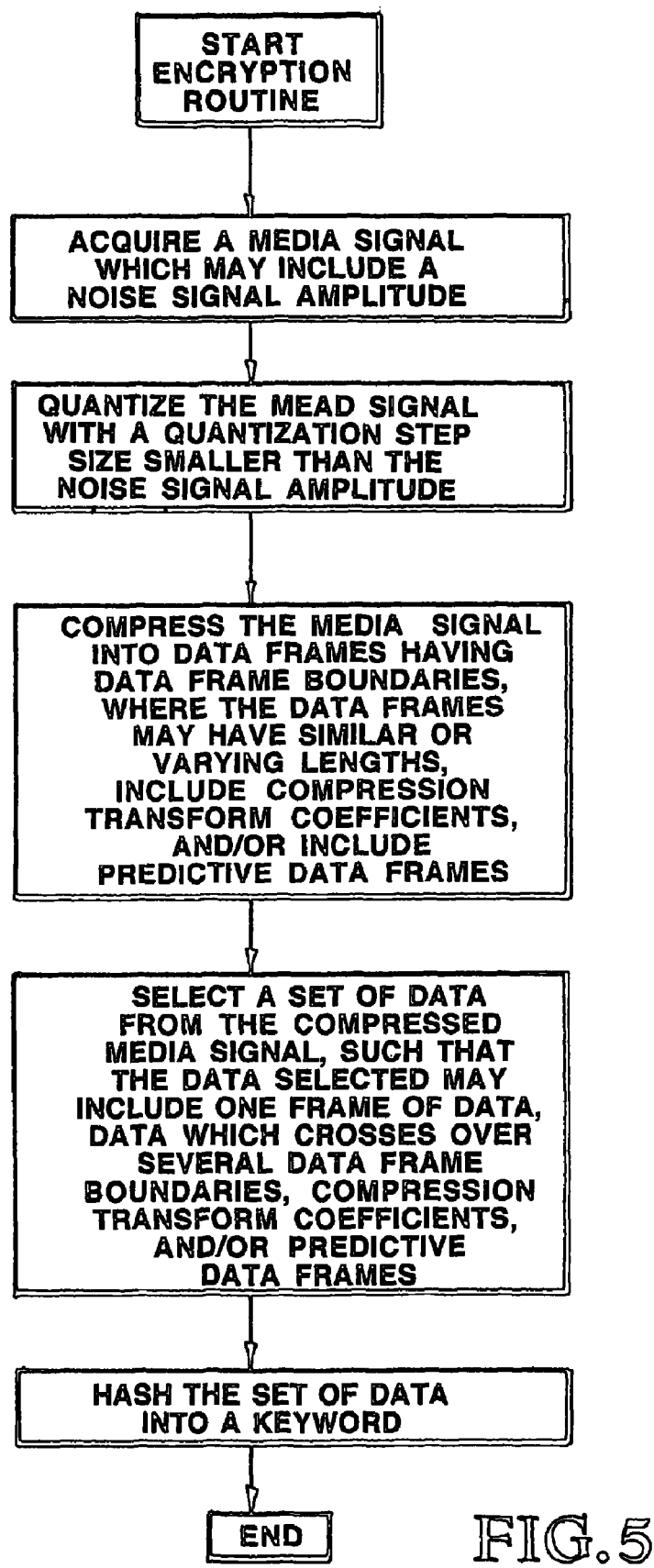
FIG. 5 is a flowchart of a method for multimedia encryption.

FIG. 5 is a flowchart 500 of a method for multimedia encryption. The method begins in step 502 where the transducer 102 receives a media signal which may include a noise signal amplitude. In step 504, the A/D converter 106 quantizes the media signal with a quantization step size smaller than the noise signal amplitude. The data compression module 302 compress the media signal into data frames having data frame boundaries, where the data frames may have similar or varying lengths, include compression transform coefficients, and/or include predictive data frames in step 506. Next, in step 508, the data acquisition module 308 selects a set of data from the compressed media signal, such that the data selected may include one frame of data, data which crosses over several data frame boundaries, compression transform coefficients, and/or predictive data frames. In step 510, the message digest generator 310 hashes the set of data into a keyword. After step 510, the method is complete.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. A method adapted for use for multimedia encryption, comprising the steps of:
  acquiring a random noise only media signal containing random noise that is unpredictable from one moment to the next and not being chaotic noise;
  compressing said random noise only media signal containing random noise that is unpredictable from one moment to the next and not being chaotic noise;
  selecting a set of data from the compressed media signal; and
  hashing the set of data into a keyword.

2. The method of claim 1 wherein: the compressed media signal includes data frames; and the selecting step includes the step of selecting one frame of data.

3. The method of claim 1 wherein: the compressed media signal includes data frames and data frame boundaries; and the selecting step includes the step of selecting a set of data which crosses over several data frame boundaries.

4. The method of claim 1 wherein: the compressed media signal includes compression transform coefficients; and the selecting step includes the step of selecting a set of compression transform coefficients.

5. The method of claim 1 wherein: the compressed media signal includes data frames of varying length; and the selecting step includes the step of selecting a set of data frames.

6. The method of claim 1 wherein: the compressed media signal includes predictive data frames; and the selecting step includes the step of selecting a predictive data frame.

7. The method of claim 1: wherein the media signal includes a noise signal amplitude; further comprising the step of quantizing the media signal with a quantization step size smaller than the noise signal amplitude; and wherein the compressing step includes the step of compressing the quantized media signal.

8. A system adapted for use for multimedia encryption comprising:
  acquisition means for acquiring a media signal, said acquisition means including a random noise transducer for acquiring random noise only, said random noise being unpredictable from one moment to the next and not being chaotic noise;
  data compression means coupled to said acquisition means to receive and compress said media signal containing random noise that is unpredictable from one moment to the next and not being chaotic noise into a compressed data stream;
  data acquisition means coupled to said data compression means to receive and select a set of data from the compressed data stream; and
  hashing means coupled to said data acquisition means to receive and hash the set of data into a keyword.

9. The system of claim 8 wherein the set of data is one frame of data within the compressed data stream.

10. The system of claim 8 wherein the set of data crosses over several frame boundaries within the compressed data stream.

11. The system of claim 8 wherein: the compressed data stream includes compression transform coefficients; and the set of data includes a set of compression transform coefficients.

12. The system of claim 8 wherein: the compressed data stream includes data frames of varying length; and the set of data includes a set of data frames.

13. The system of claim 8 wherein: the compressed data stream includes predictive data frames; and the set of data includes a predictive data frame.

14. The system of claim 8: wherein the media signal includes a noise signal amplitude; further comprising, an analog to digital converter, having a quantization step size smaller than the noise signal amplitude, coupled to receive and quantize the media signal; and wherein the data compression module compresses the quantized media signal into a compressed data stream.

15. The system of claim 8 wherein the data compression module compresses the media signal into one from a group consisting of: MJPEG, MPEG1, MPEG2, or MPEG4, H.261, H.320, and H.323 formats.

16. The system of claim 8 further comprising: a pseudorandom number generator coupled to receive and process the keyword in to a set of keywords.

17. A system adapted for use for multimedia encryption, comprising:
  acquisition means for acquiring a media signal, said acquisition means including a random noise transducer for acquiring said media signal, said random noise transducer acquiring said media signal containing only random noise that is unpredictable from one moment to the next and not being chaotic noise;
  data compression means coupled to said acquisition means to receive and compress said media signal containing random noise that is unpredictable from one moment to the next into a compressed data stream;
  selection means coupled to said data compression means for selecting a set of data from the compressed data stream; and
  hashing means coupled to said selection means for hashing the set of data into a keyword.

18. The system of claim 17 wherein: the compressed media signal includes data frames; and the means for selecting includes means for selecting one frame of data.

19. The system of claim 17 wherein: the compressed media signal includes data frames and data frame boundaries; and the means for selecting includes means for selecting a set of data which crosses over several data frame boundaries.

20. The system of claim 17 wherein: the compressed media signal includes compression transform coefficients; and the means for selecting includes means for selecting a set of compression transform coefficients.

21. The system of claim 17 wherein: the compressed media signal includes data frames of varying length; and the means for selecting includes means for selecting a set of data frames.

22. The system of claim 17 wherein: the compressed media signal includes predictive data frames; and the means for selecting includes means for selecting a predictive data frame.

23. The system of claim 17: wherein the media signal includes a noise signal amplitude; further comprising means for quantizing the media signal with a quantization step size smaller than the noise signal amplitude; and wherein the means for compressing includes means for compressing the quantized media signal.

24. A computer-useable medium embodying computer program code adapted for use for multimedia encryption by executing the steps of:
   acquiring a random noise only media signal, said random noise only media signal containing random noise that is unpredictable from one moment to the next and not being chaotic noise;
   compressing said random noise only media signal, said random noise only media signal containing random noise that is unpredictable from one moment to the next and not being chaotic noise;
   selecting a set of data from the compressed media signal; and
   hashing the set of data into a keyword.

25. The computer-useable medium of claim 24 wherein: the compressed media signal includes data frames; and the selecting step includes the step of selecting one frame of data.

26. The computer-useable medium of claim 24 wherein: the compressed media signal includes data frames and data frame boundaries; and the selecting step includes the step of selecting a set of data which crosses over several data frame boundaries.

27. The computer-useable medium of claim 24 wherein: the compressed media signal includes compression transform coefficients; and the selecting step includes the step of selecting a set of compression transform coefficients.

28. The computer-useable medium of claim 24 wherein: the compressed media signal includes data frames of varying length; and the selecting step includes the step of selecting a set of data frames.

29. The computer-useable medium of claim 24 wherein: the compressed media signal includes predictive data frames; and the selecting step includes the step of selecting a predictive data frame.

30. The computer-useable medium of claim 24: wherein the media signal includes a noise signal amplitude; further comprising the step of quantizing the media signal with a quantization step size smaller than the noise signal amplitude; and wherein the compressing step includes the step of compressing the quantized media signal.

* * * * *